(12) United States Patent
Richter et al.

(10) Patent No.: US 10,461,686 B2
(45) Date of Patent: Oct. 29, 2019

(54) COOLING MODULE FOR A PHOTOVOLTAIC UNIT

(71) Applicant: ITP GmbH—Gesellschaft fuer Intelligente Textile Produkte, Chemnitz (DE)

(72) Inventors: Klaus Richter, Weimar (DE); Karen Jimenez, Weimar (DE); Dirk Huschke, Rittersdorf (DE)

(73) Assignee: ITP GmbH—Gesellschaft fuer Intelligente Textile Produkte, Chemnitz (DE)

( * ) Notice: Subject to any disclaimer, the term of this patent is extended or adjusted under 35 U.S.C. 154(b) by 0 days.

(21) Appl. No.: 15/965,140

(22) Filed: Apr. 27, 2018

(65) Prior Publication Data

US 2018/0248510 A1    Aug. 30, 2018

Related U.S. Application Data

(63) Continuation of application No. PCT/EP2016/075887, filed on Oct. 27, 2016.

(30) Foreign Application Priority Data

Oct. 27, 2015 (DE) .......... 10 2015 220 984

(51) Int. Cl.
*H02S 40/42* (2014.01)
*H02S 40/44* (2014.01)

(52) U.S. Cl.
CPC ............ *H02S 40/425* (2014.12); *H02S 40/44* (2014.12); *Y02E 10/60* (2013.01)

(58) Field of Classification Search
CPC ........ H02S 40/40; H02S 40/42; H02S 40/425; H02S 40/44
See application file for complete search history.

(56) References Cited

U.S. PATENT DOCUMENTS

| | | | |
|---|---|---|---|
| 3,937,208 A * | 2/1976 | Katz | F24S 80/30 126/665 |
| 4,244,353 A * | 1/1981 | Straza | E04D 1/24 126/622 |
| 4,413,157 A * | 11/1983 | Ames | H01L 31/052 136/246 |
| 7,956,278 B1 | 6/2011 | Popovich | |
| 2005/0061311 A1 | 3/2005 | Christensen | |
| 2007/0028960 A1 | 2/2007 | Royne et al. | |
| 2008/0073062 A1 | 3/2008 | Schuette | |
| 2008/0302405 A1 * | 12/2008 | Intrieri | H02S 40/44 136/246 |
| 2009/0308433 A1 | 12/2009 | Schuette | |
| 2011/0297144 A1 | 12/2011 | Tarakçioglu | |
| 2013/0160814 A1 | 6/2013 | Ahlgren et al. | |
| 2014/0360556 A1 | 12/2014 | Koppikar et al. | |

FOREIGN PATENT DOCUMENTS

| | | |
|---|---|---|
| DE | 202004013267 U1 | 2/2005 |
| DE | 102005054367 A1 | 5/2007 |
| DE | 102013008957 A1 | 11/2014 |
| DE | 102013214470 A1 | 1/2015 |

* cited by examiner

*Primary Examiner* — Eli S Mekhlin
(74) *Attorney, Agent, or Firm* — Muncy, Geissler, Olds & Lowe, P.C.

(57) ABSTRACT

A cooling module for a photovoltaic unit, whereby a core is provided which is in the form of a panel-type 3D fabric, is designed as a knitted fabric spacer and can be penetrated by a fluid.

6 Claims, 4 Drawing Sheets

COOLING MODULE FOR A PHOTOVOLTAIC UNIT

This nonprovisional application is a continuation of International Application No. PCT/EP2016/075887, which was filed on Oct. 27, 2016, and which claims priority to German Patent Application No. DE 10 2015 220 984.9, which was filed in Germany on Oct. 27, 2015, and which are both herein incorporated by reference.

BACKGROUND OF THE INVENTION

Field of the Invention

The present invention relates to a cooling module for a photovoltaic unit, whereby a core is provided which is in the form of a panel-type 3D fabric and is designed as a knitted spacer fabric, through which a fluid can flow.

Description of the Background Art

Cooling modules for photovoltaic units are known in the prior art which protect the units from overheating and are to be used to improve efficiency. Occasionally, the heat to be dissipated during cooling of the photovoltaic units is removed by means of a fluid and is used.

SUMMARY OF THE INVENTION

It is therefore an object of the present invention to provide an improved cooling module for a photovoltaic unit.

A cooling module is provided for a photovoltaic unit. According to an exemplary embodiment of the invention, the cooling module has a core which is formed as a panel-type 3D fabric and designed as a knitted spacer fabric, through which a fluid can flow. The knitted spacer fabric has a plurality of pile threads, as a result of which the panel-type core and thus the entire cooling module have a high resistance to forces acting normal to the panel direction. The arrangement of a panel-type core, designed as a 3D fabric and as a knitted spacer fabric, forms an element through which fluid can flow very well. As a result, the cooling module is particularly effective and can remove especially homogeneous heat from a photovoltaic unit.

An embodiment of the cooling module provides that at least one surface of the core is provided with a coating which is fluid-tight, in particular water-impermeable and weather-resistant. As a result, the element through which fluid can readily flow is formed in a simple manner. According to a first alternative, both surfaces of the core are preferably provided with the coating. As a result, good fluid-tightness can be achieved at relatively little cost. According to a second alternative, the core surface facing away from the photovoltaic unit is provided with the coating, and the core surface facing the photovoltaic unit is connected to the photovoltaic unit in a fluid-tight, in particular watertight manner. This enables a particularly effective heat removal from the photovoltaic unit directly to the fluid, as a result of which the cooling module can be made particularly effectively and comparatively thin structurally. Particularly preferably, a coating is made of silicone and has a single-layer or multilayer structure. A first, therefore inner, silicone layer produces a good bond to the knitted spacer fabric, and the second, outer silicone layer serves to close openings of the first silicone layer, so that an especially reliable fluid-tightness can be achieved by the multilayer structure of the silicone coating.

An embodiment of the cooling module provides that edge surfaces of the core are each provided with an edging, the surfaces being fluid-impermeable. As a result, the closed element can be produced in a simple manner.

In this case, a number of the edgings preferably each have a U-shaped cross section. This U-shaped cross section in each case has an edge-parallel crosspiece and in each case two parallel flanges whose inner distance corresponds to the thickness of the core with the one-sided or double-sided coating. Particularly preferably, inner surfaces of the two parallel flanges are each at least partially connected in a fluid-tight manner to the outer surfaces of the two-sided coatings. As a result, a reliable fluid-tightness of the closed element can be effected in a simple manner.

The edgings can be arranged on two opposite edge surfaces of the core such that the crosspiece of the edging is spaced from the corresponding side edge surface such that a cavity is formed by the side edge surface and the corresponding edging. Fluid can flow through this cavity parallel to the side edge surface. As a result, a particularly effective channel can be formed, which can be used for a transverse distribution of the fluid before and/or after fluid has flown through the core in a longitudinal direction. The flow in the transverse distribution of the fluid parallel to the side edge surface in said channel makes it possible that the flow through the core formed as a knitted spacer fabric is very homogeneous, therefore, very uniform with a largely constant volumetric flow. The cooling module thus enables an areally uniform and thus very effective removal of heat from the photovoltaic unit. As a result, the cooling module can be made relatively thin and relatively inexpensive to produce.

A number of inlets can be arranged on a first edging and a number of outlets on the second edging opposite the first edging. The greater the number of inlets or outlets, the smaller the respective cavity that can be formed to enable sufficient transverse distribution of the fluid. Particularly preferably, two inlets and outlets are each arranged normal to the cooling module and designed as tubes for connecting a fluid line. Preferably, the inlets and outlets are each provided with an external thread.

A refinement provides that edgings arranged on two other, likewise opposite edge surfaces can be arranged such that in each case the crosspiece abuts the corresponding side edge surface which lies in the longitudinal flow direction. As a result, the fluid cannot flow parallel to this side edge surface between the side edge surface and the corresponding edging, as a result of which the fluid can flow exclusively through the core in the longitudinal flow direction. As a result, a particularly homogeneous flow in the longitudinal direction is made possible in a simple manner.

A number of the edgings can be made of aluminum, as a result of which the cooling module can be produced with a low weight and high accuracy.

Corner joints of two adjacent edgings can each be formed watertight, for example, glued or connected by means of a fluid-tight corner element. As a result, the closed element is fully sealable. Alternatively, an edging may be integrally formed with an end-face corner element or with two end-face corner elements.

An opening can be provided which penetrates the core and the coatings and is formed such that the fluid cannot escape. This fluid-tight passage, located between the opposing coatings, through the core is used to pass through electrical lines of the associated photovoltaic unit. This passage is preferably located next to one of the edgings, which has inlets or outlets. It is possible as a result to place a photovoltaic unit on the top coating and to place a so-called junction box, which is used for the electrical connection, under the bottom coating, whereby electrical lines can be passed from the photovoltaic unit to the junction box through the cooling module. In contrast to the prior art, this makes it possible to cool the photovoltaic unit over the entire area and completely, and therefore evenly. In particular, a photovoltaic unit can not only be formed in the area of a junction box but is also efficiently coolable.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
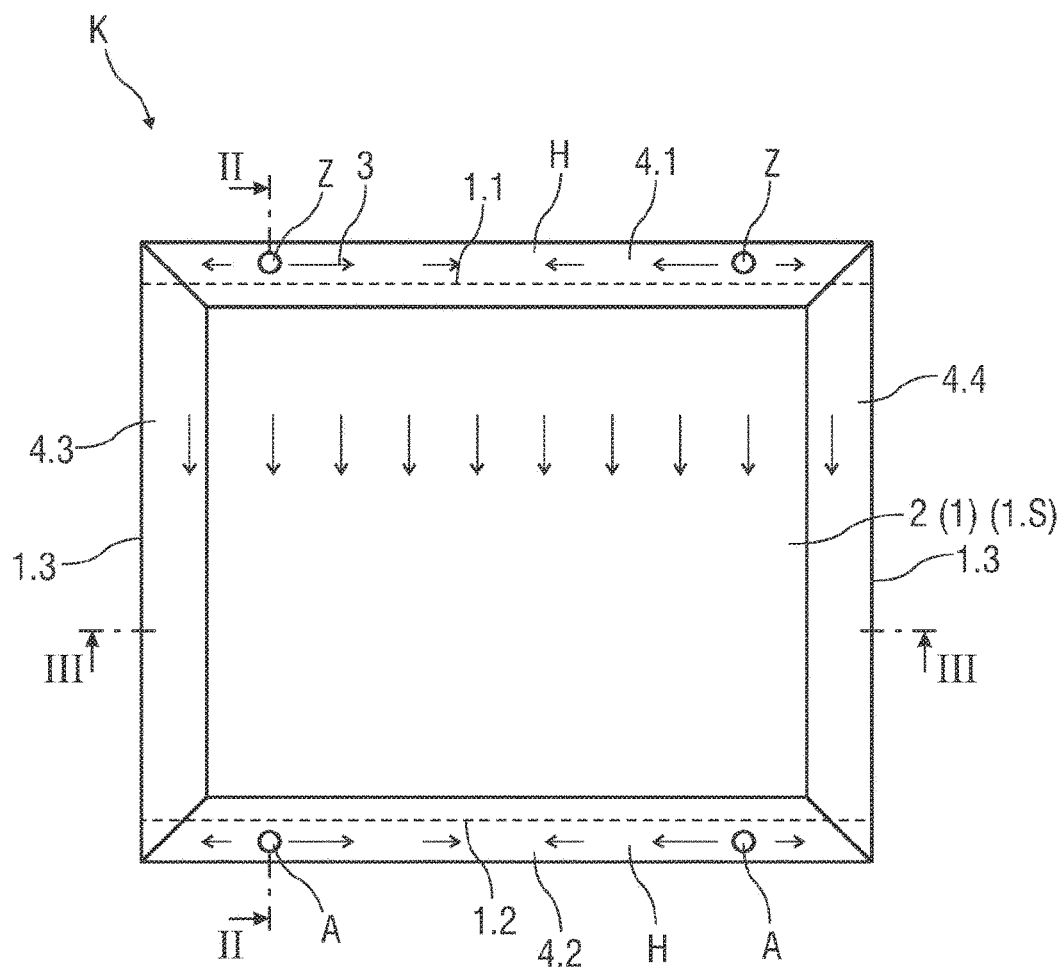
FIG. 1 shows a schematic top plan view of an embodiment of the cooling module of the invention.

FIG. 1 shows a schematic top plan view of an embodiment of a cooling module K of the invention. Cooling module K comprises a panel-type core 1, and the 3D fabric is formed as a knitted spacer fabric. Core 1 has a plurality of pile threads and is provided on both sides, therefore on both of its parallel surfaces 1.S, with a water-impermeable two-layer coating 2 made of silicone.

The panel-type core 1 has a first edge surface 1.1, a second edge surface 1.2, a third edge surface 1.3, and a fourth edge surface 1.4, on each of which correspondingly a first edging 4.1, a second edging 4.2, a third edging 4.3, and a fourth edging 4.4 is arranged.

All edgings 4.1, 4.2, 4.3, 4.4 each have a U-shaped cross section, shown in greater detail in the following figures, with an edge-parallel crosspiece S and two parallel flanges F and are made of aluminum. Edgings 4.1, 4.2, 4.3, 4.4 are themselves watertight and are connected to coating 2 in a watertight manner. The corner joints of adjacent edgings 4.1, 4.2, 4.3, 4.4, said joints formed by a miter, are not only mechanically strong but also watertight.

Corresponding first and second edgings 4.1, 4.2 are arranged on the two opposite first and second edge surfaces 1.1, 1.2 such that in each case crosspiece S (not indicated here) is spaced from the corresponding side edge surface 1.1, 1.2 such that a cavity H is formed, through which a fluid 3 can flow substantially parallel to side edge surface 1.1, 1.2. The flow direction of fluid 3 is represented by arrows, whereby the arrow length is shown schematically corresponding to the amount of the volumetric flow.

Third and fourth edgings 4.3, 4.4 are arranged on the two opposite third and fourth edge surfaces 1.3, 1.4 such that in each case crosspiece S abuts the corresponding side edge surface 1.3, 1.4.

Two tubular inlets Z are arranged normal to the panel plane on first edging 4.1 and two tubular outlets A are arranged normal to the panel plane on second edging 4.2 opposite first edging 4.1. Lines for the cooling fluid can be connected to inlets Z and to outlets A.

Fluid 3 flowing in via the two inlets Z into cavity H shown above is initially distributed substantially transversely therein and flows very uniformly parallel to the third and fourth edge surface 1.3, 1.4 through core 1 in the direction of the arrow group shown in the center. In this longitudinal flow direction, the fluid flows exclusively through core 1, as a result of which the especially homogeneous through-flow is made possible in a simple manner.

After flowing through core 1 in the longitudinal direction, fluid 3 enters cavity H shown below, in which it flows substantially transversely, therefore, horizontally, to outlets A, from which it then flows into a line.

Figure 2:
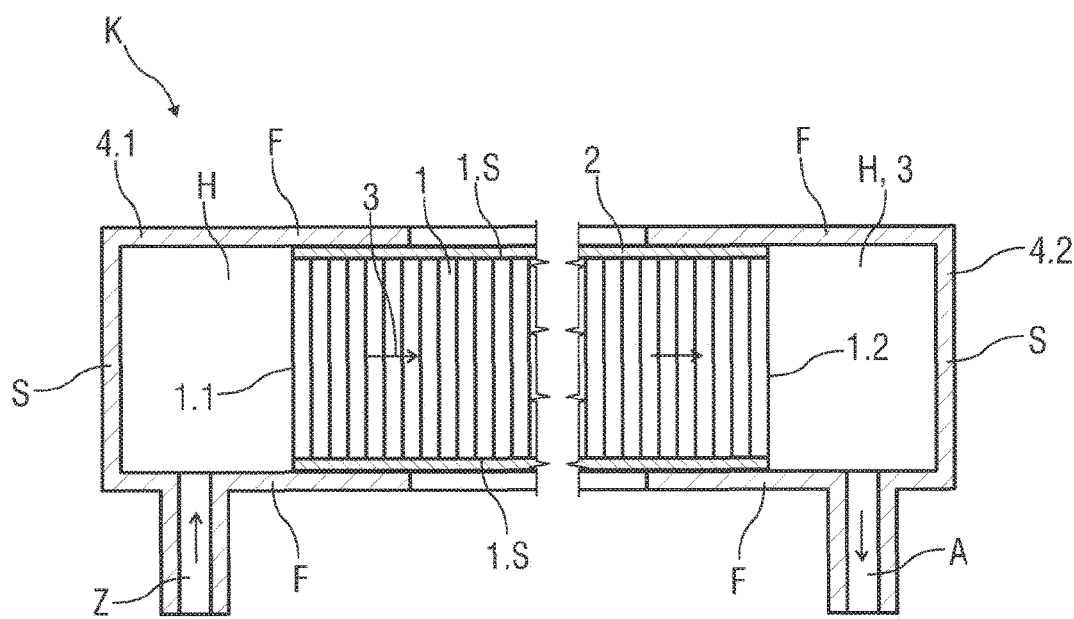
FIG. 2 shows an associated schematic cross section.

FIG. 2 shows a schematic cross section of cooling module K from FIG. 1. The first edging 4.1 shown on the left and second edging 4.2 shown on the right each have the aforementioned U-shaped cross section, each with an edge-parallel crosspiece S and two parallel flanges F.

The inner surfaces of flanges F are connected in a watertight manner in each case to the corresponding outer surface of coating 2, which is placed on each of the surfaces 1.S. Crosspiece S of each edging 4.1 and 4.2 is spaced from the respective corresponding side edge surface 1.1, 1.2, so that the aforementioned cavity H is formed, through which fluid 3 can flow substantially parallel to side edge surface 1.1, 1.2 before or after fluid 3 flows through core 1 in the direction of the arrows from left to right.

One of the tubular inlets Z is shown at the bottom of first edging 4.1; one of the tubular outlets A is shown at the bottom of second edging 4.2.

Figure 3:
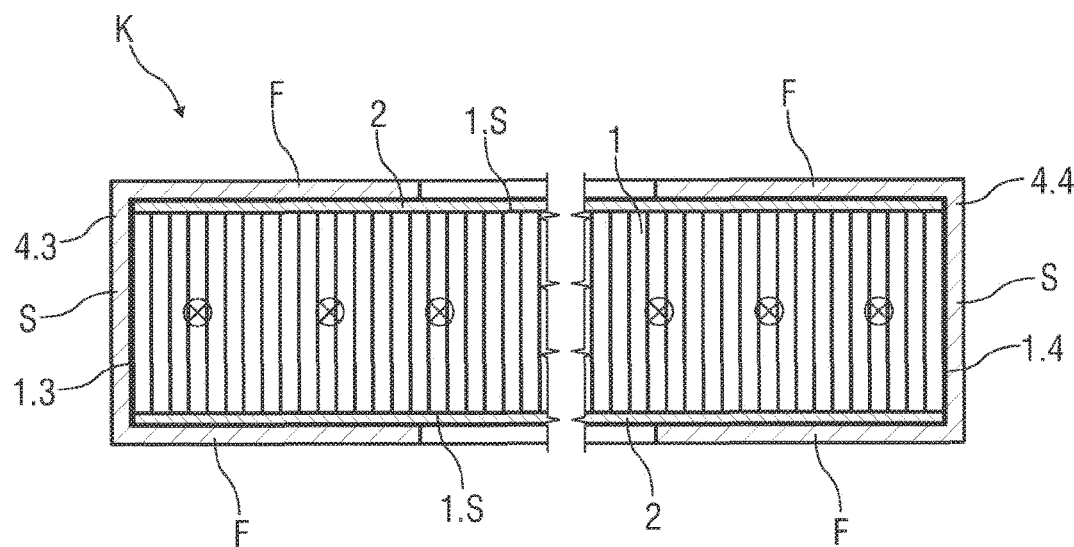
FIG. 3 shows an associated schematic longitudinal section.

FIG. 3 shows a schematic longitudinal section of cooling module K from FIGS. 1 and 2. Third edging 4.3 shown on the left and fourth edging 4.4 shown on the right also each have the aforementioned U-shaped cross section, each with an edge-parallel crosspiece S and two parallel flanges F.

The inner surfaces of these flanges F are also connected watertight in each case to the corresponding outer surface of coating 2, which is placed on each of the surfaces 1.S. Crosspiece S of each edging 4.3 and 4.4 abuts directly the corresponding side edge surface 1.3, 1.4, so that fluid 3 in the area of core 1 can flow substantially parallel to side edge surface 1.3, 1.4; this is schematically represented by five arrow ends.

Figure 4:
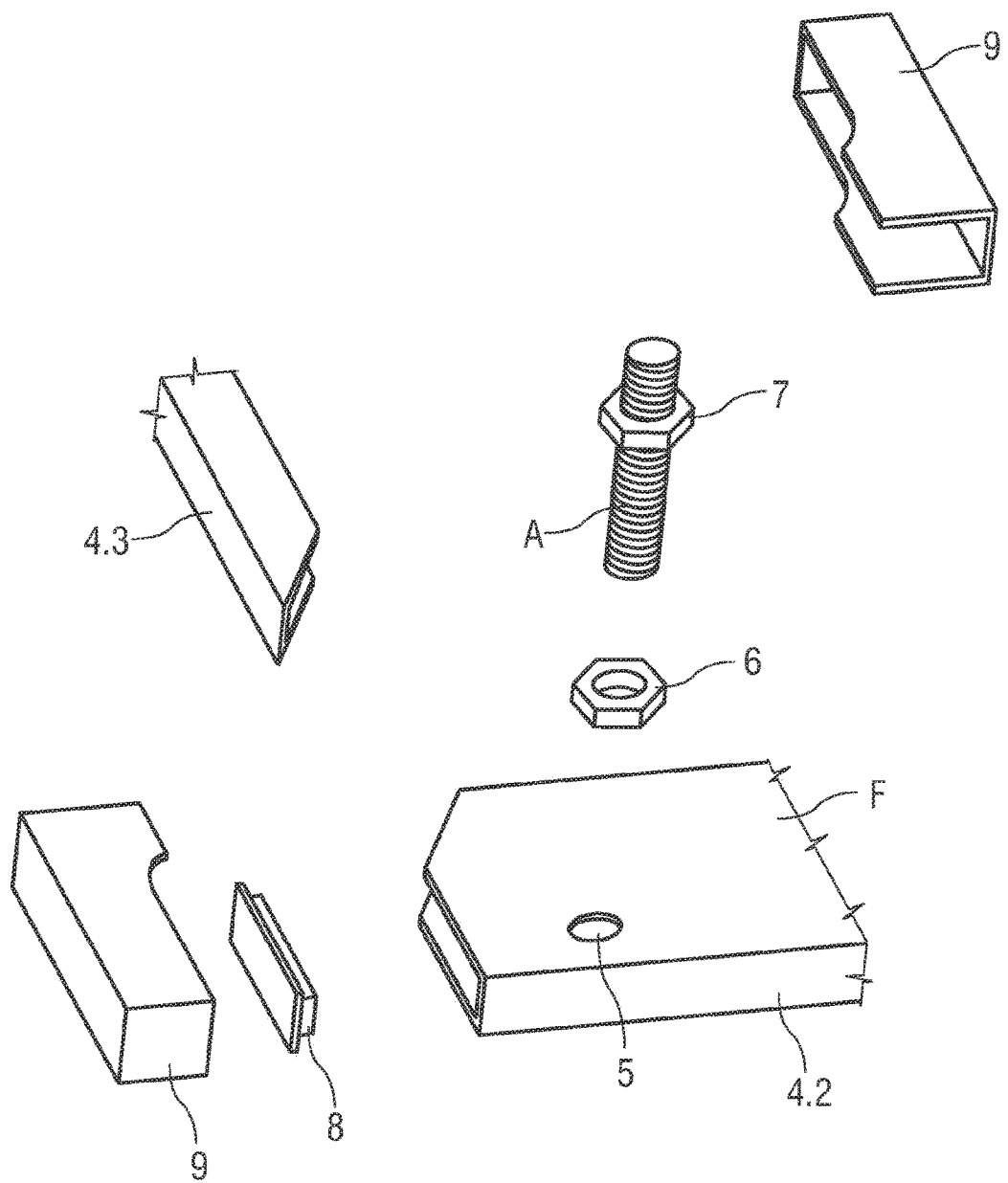
FIG. 4 is an exploded perspective illustration of an embodiment of the cooling module of the invention.

FIG. 4 shows a detail of an exploded perspective illustration of a second embodiment of the cooling module K of the invention. It is shown schematically how to connect second edging 4.2 to third edging 4.3 and how second edging 4.2 and third edging 4.3 are formed to this end. Second edging 4.2 and third edging 4.3 have a miter in the connection area.

The width of flange F of second edging 4.2 is greater than that of third edging 4.3 and has a hole 5, to which outlet A, which is designed as a threaded tube, can be connected. According to a first alternative, a first nut 6 is attached in a watertight manner on the top side of flange F of second edging 4.2; then outlet A designed as a threaded tube is screwed in a watertight manner in said first nut 6. A second nut 7 is used for locking and thus for fixing outlet A in first nut 6. According to a second alternative, first nut 6 is disposed below flange F and second nut 7 above flange F and screwed together when outlet A is screwed in; in this case, outlet A is connected in a watertight manner to second edging 4.2.

An end-face opening of second edging 4.2 will be sealed or is sealed watertight by means of a plug 8; for example, plug 8 is glued in in a watertight manner. The corner region formed by third edging 4.3 attached to second edging 4.2, including plug 8, will be or is covered by a corner shoe 9, which is shown in two views for better understanding. For this purpose, the inner width of corner shoe 9 is slightly larger than the outer width of second edging 4.2 and third edging 4.3. By means of the overlapping, the thus formed corner between second edging 4.2 and third edging 4.3 can be produced mechanically stable in a simple manner. Corner shoe 9 is preferably glued on to produce watertightness.

The three further corner regions of cooling module K, which is shown only partially here and which also comprises two corresponding inlets Z apart from two outlets A, are formed analogously. Core 1 with coatings 2 is formed as described in the aforementioned figures and is enclosed watertight by edgings 4.1 to 4.4.

Figure 5:
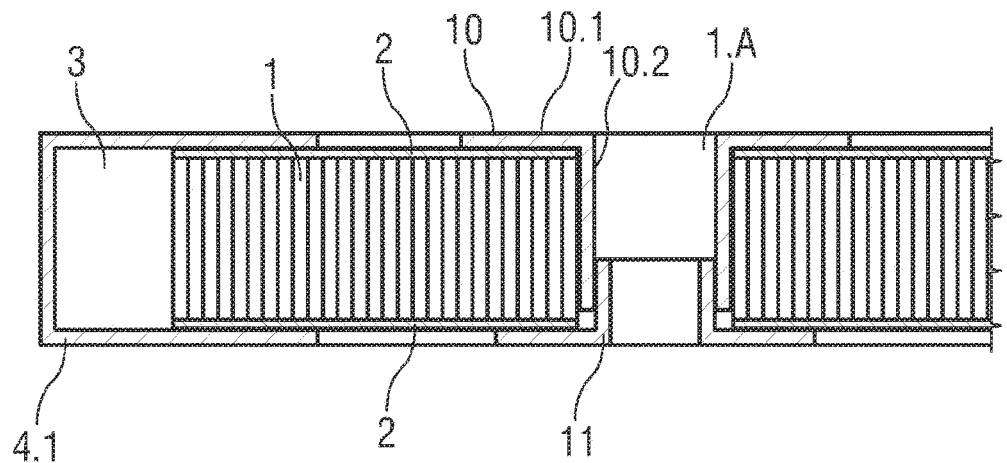
FIG. 5 is a schematic sectional illustration of a detail of a cooling module of the invention.

FIG. 5 shows a schematic sectional view of a detail of a cooling module K of the invention with an opening 1.A, which is used for passing through electrical cables of a photovoltaic unit. Opening 1.A is formed in core 1 such that fluid 3 cannot escape. For this purpose, a top passage element 10 is connected in a watertight manner to a bottom passage element 11. The top passage element 10 is also connected in a watertight manner to top coating 2. Bottom passage element 11 is connected in a watertight manner to bottom coating 2.

Figure 6:
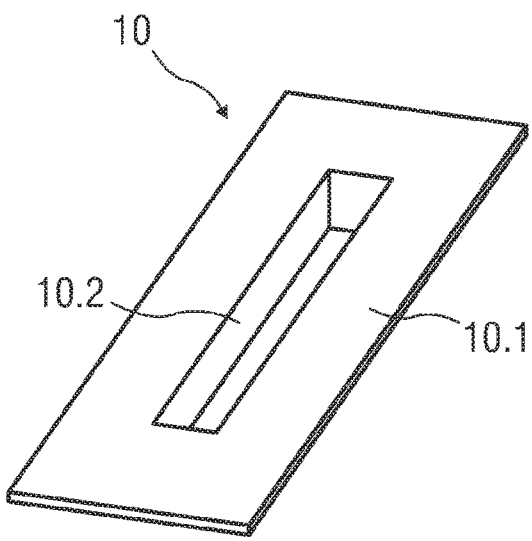
FIG. 6 is a schematic, perspective illustration of a top passage element.

For this purpose, top passage element 10, which is shown in perspective in FIG. 6, has a plate-shaped top flange 10.1, which is glued at the bottom to the top surface of top coating 2. Top passage element 10 also has a collar 10.2, in which a corresponding collar of bottom passage element 11 can be inserted and glued in a watertight manner. Bottom passage element 11 has a plate-shaped flange region, which is glued at the top to the bottom side of bottom coating 2.

Cooling module K preferably has a length of 1000 mm to 2000 mm, particularly preferably of 1500 mm. The preferred width is 600 mm to 1000 mm, particularly preferably 800 mm. The preferred thickness is 6 mm to 10 mm, particularly preferably 8 mm. Multiple cooling modules K, in particular those with the standard dimensions of 1500 mm×800 mm×8 mm, can be connected together to form larger modules.

Preferably, the diameters of inlets Z and outlets A are between 3/8 inch and 1 inch.

Before cooling module K is mounted on the corresponding photovoltaic unit, it is subjected to a quality inspection. To this end, cooling module K is first tested without pressure with an open system and then with a closed system with a pressure of 3 bar.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling module for a photovoltaic unit, the cooling module comprising:
   a core formed as a panel-type 3D fabric and designed as a knitted fabric spacer, through which a fluid is adapted to flow, edge surfaces of the core being provided with an edging, the edge surfaces being fluid-impermeable;
   at least two edgings having a U-shaped cross section with an edge-parallel crosspiece and two parallel flanges, the at least two edgings arranged on two opposite edge surfaces are arranged such that each of the crosspieces is spaced from a corresponding side edge surface such that a rectangular cavity, through which the fluid is adapted to flow parallel to the side edge surface, is formed by the side edge surface and the corresponding edging;
   at least two inlets arranged on a first edging; and
   at least two outlets arranged on the second edging opposite the first edging,
   wherein surfaces of the core are each provided with a fluid-impermeable coating directly thereon, and
   wherein the two parallel flanges each have a planar inner side and each planar inner side is arranged flat directly on a partial region of the fluid-impermeable coatings.

2. The cooling module according to claim 1, wherein the edgings arranged on two opposite edge surfaces are arranged such that the crosspiece abuts the corresponding side edge surface.

3. The cooling module according to claim 1, wherein at least two of the edgings are made of aluminum or plastic.

4. The cooling module according to claim 1, wherein corner joints of two adjacent edgings are each formed watertight.

5. The cooling module according to claim 1, wherein the fluid-impermeable coating is formed single-layered or multi-layered and made of silicone.

6. The cooling module according to claim 1, further comprising an opening which penetrates the core and the coatings and which is formed such that the fluid cannot escape.

* * * * *